(12) United States Patent
Ohno et al.

(10) Patent No.: US 6,219,715 B1
(45) Date of Patent: Apr. 17, 2001

(54) AUTOMATIC ADDRESS DISTRIBUTING SYSTEM

(75) Inventors: Shuji Ohno; Tatsuya Watanuki, both of Yokohama; Norihiro Goto, Ebina; Takashi Kitayama, Yokohama, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 08/918,108

(22) Filed: Aug. 27, 1997

(30) Foreign Application Priority Data

Aug. 29, 1996 (JP) .................................................. 8-247229

(51) Int. Cl.$^7$ .................................................. H04L 12/66
(52) U.S. Cl. .......................... 709/245; 709/201; 709/202; 709/203; 709/205; 709/220; 370/401; 370/402
(58) Field of Search .......................... 709/200, 201–203, 709/205, 245, 220, 228; 370/401, 402

(56) References Cited

U.S. PATENT DOCUMENTS 5,790,548 * 4/1996 Sistanizadeh et al. ............... 370/401

OTHER PUBLICATIONS

"Dynamic Host Configuration Protocol" Request for Comments (RFC) 1541, IETF, R Droms, Bucknell University, Oct. 1993.

Charles Perkins "DHCP for Mobile Networking with JCP/IP," IBM, T. J. Watson Research Center, IEEE, 1995.*

* cited by examiner

Primary Examiner—Krisna Lim
Assistant Examiner—Hien C. Le
(74) Attorney, Agent, or Firm—Antonelli, Terry Stout & Kraus, LLP

(57) ABSTRACT

An automatic address distributing method, computer program and system for automatically examining addresses already assigned to terminals connected to a network without regard to the status of the existing terminals and removed terminals. An address may be assigned to a terminal by apparatus other than a DHCP server. After a Dynamic Host Configuration Protocol (DHCP) server has been started, addresses currently used in a network are examined by a duplicate-address examining unit and the status of the address are stored in an in-use-address database (DB). When a terminal makes a request for distribution of an address, the DHCP server distributes an address that is currently not used in the network. In the examination carried out by the duplicate-address examining unit, an inquiry about the entire name information controlled by a Domain Name Service (DNS) server is made to the DNS server. Results of the inquiry are also stored in the in-use-address DB. Then, a mobile-agent DB is examined for a mobile agent. An inquiry about information on movement status of mobile terminals is made to the mobile agent cataloged in the mobile-agent DB. Results of this inquiry are also stored in the in-use-address DB.

6 Claims, 6 Drawing Sheets

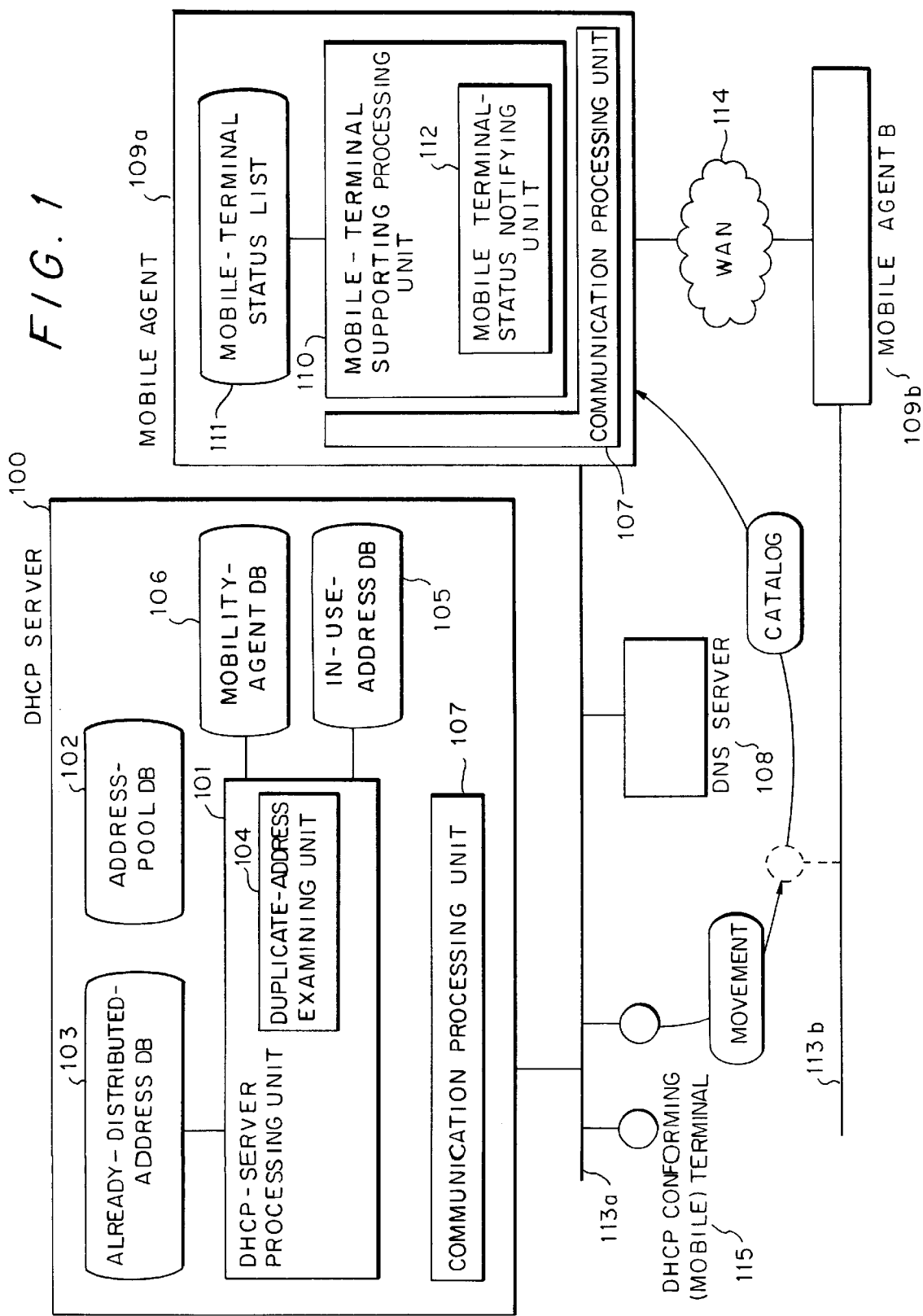

FIG. 2

| ADDRESS (21) | DISTRIBUTION STATUS (22) | ADDITIONAL INFORMATION (23) | 102 |
|---|---|---|---|
| 192.128.16.1 | DONE | SUBNET, DOMAIN NAME AND OTHER INFORMATION | |
| 192.128.16.4 | DONE | SUBNET, DOMAIN NAME AND OTHER INFORMATION | |
| 192.128.16.12 | NOT YET | SUBNET, DOMAIN NAME AND OTHER INFORMATION | |
| 192.128.64.18 | DONE | SUBNET, DOMAIN NAME AND OTHER INFORMATION | |
| ⋮ | ⋮ | ⋮ | |

FIG. 3

| IN-USE ADDRESS (31) | TERMINAL TYPE (32) | REMARK (33) | 105 |
|---|---|---|---|
| 192.128.16.1 | DNS | HOST NAME (aaa.dhcp.co.jp) | |
| 192.128.16.4 | DNS | HOST NAME (bbb.dhcp.co.jp) | |
| ⋮ | ⋮ | ⋮ | |
| 192.128.16.12 | MOBILE | INFORMATION ON MOVEMENT-DESTINATION NETWORK | |
| 192.128.64.18 | NULL | — | |
| ⋮ | ⋮ | ⋮ | |

FIG. 4

| MOBILE-AGENT ADDRESS (41) | RELATED INFORMATION (42) | 106 |
|---|---|---|
| 192.128.16.255 | OPERATION STATUS AND OTHER INFORMATION | |
| 192.128.127.1 | OPERATION STATUS AND OTHER INFORMATION | |
| ⋮ | ⋮ | |

F I G. 5

| 103 | TERMINAL DESCRIPTOR | DISTRIBUTED INFORMATION | ADDRESS-DISTRIBUTION TIME AND DATE | VALIDITY PERIOD (INITIAL VALUE) | VALIDITY PERIOD (CURRENT VALUE) | EXTENSION COUNT | USE STATUS |
|---|---|---|---|---|---|---|---|
| | 51 | 52 | 53 | 54 | 55 | 56 | 57 |
| | 0:10:2a:3c:4e:5f | 192.128.16.1, SUBNET,... | '96/3/2, 9:03 | 3600 | | 9 | IN USE |
| | 0:2a:30:1c:7e:33 | 192.128.16.4, SUBNET,... | | 10800 | | 4 | |
| | ... | ... | ... | ... | ... | ... | ... |
| | 8:1:2f:8c:55:9b | 192.128.16.12, SUBNET,... | '96/3/1, 8:45 | 3600 | | 3 | NOT USED |
| | 0:c:e:1a:25:6b | 192.128.64.18, SUBNET,... | '96/3/2, 8:51 | 7200 | | 0 | |
| | ... | ... | ... | ... | ... | ... | ... |

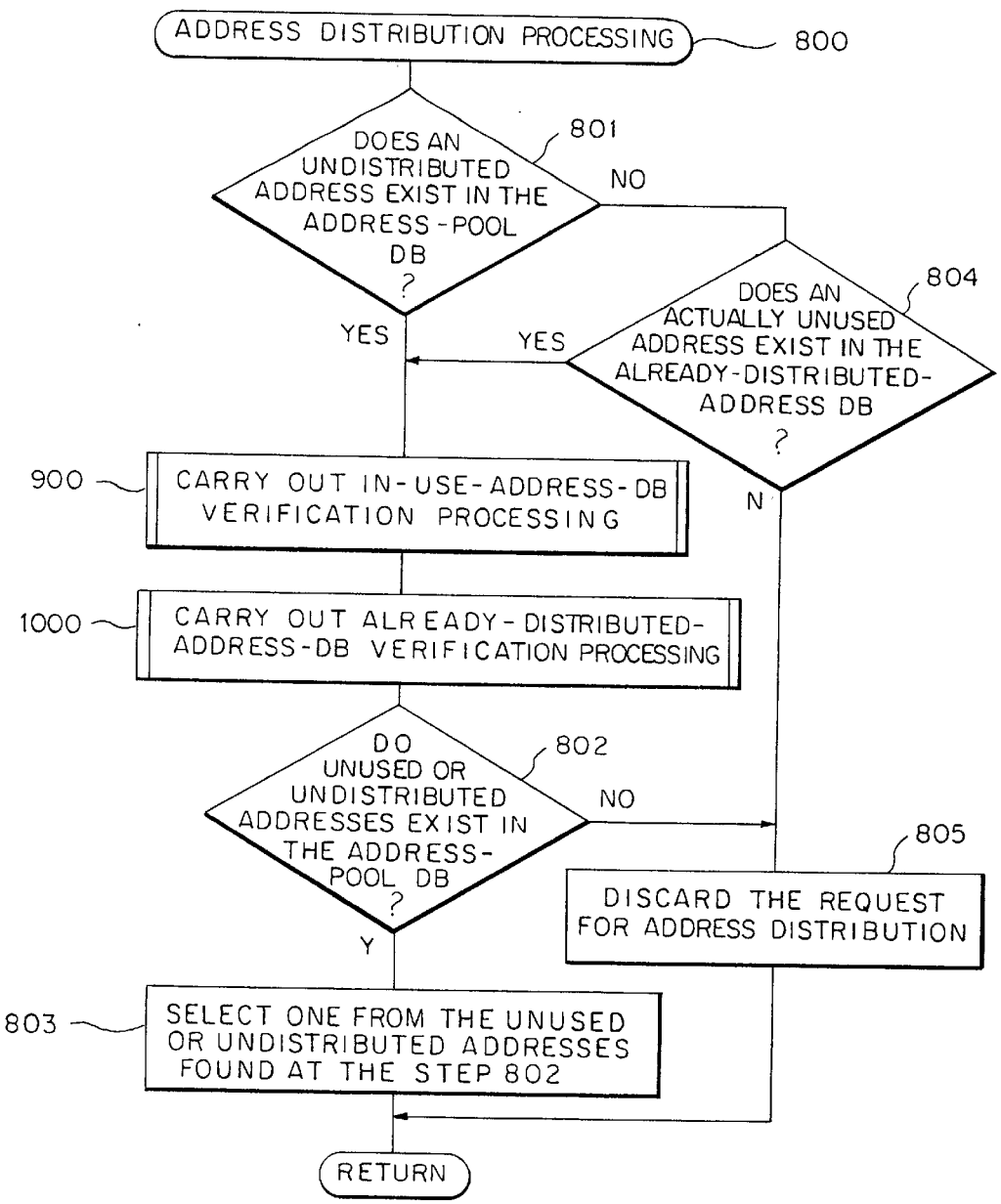
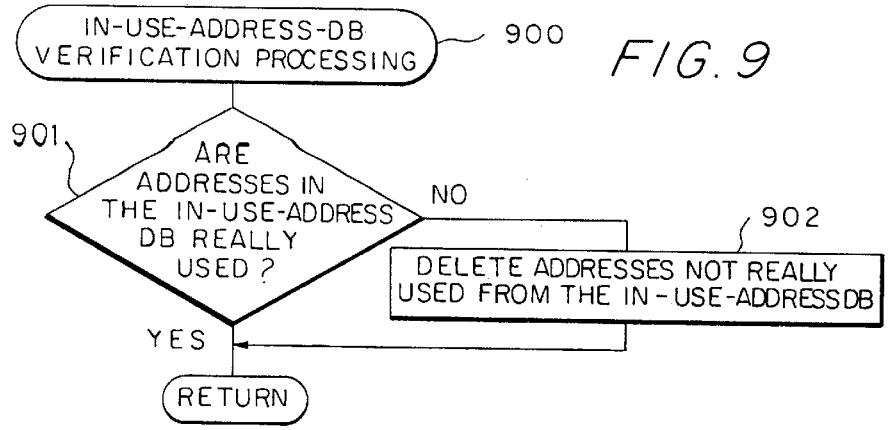

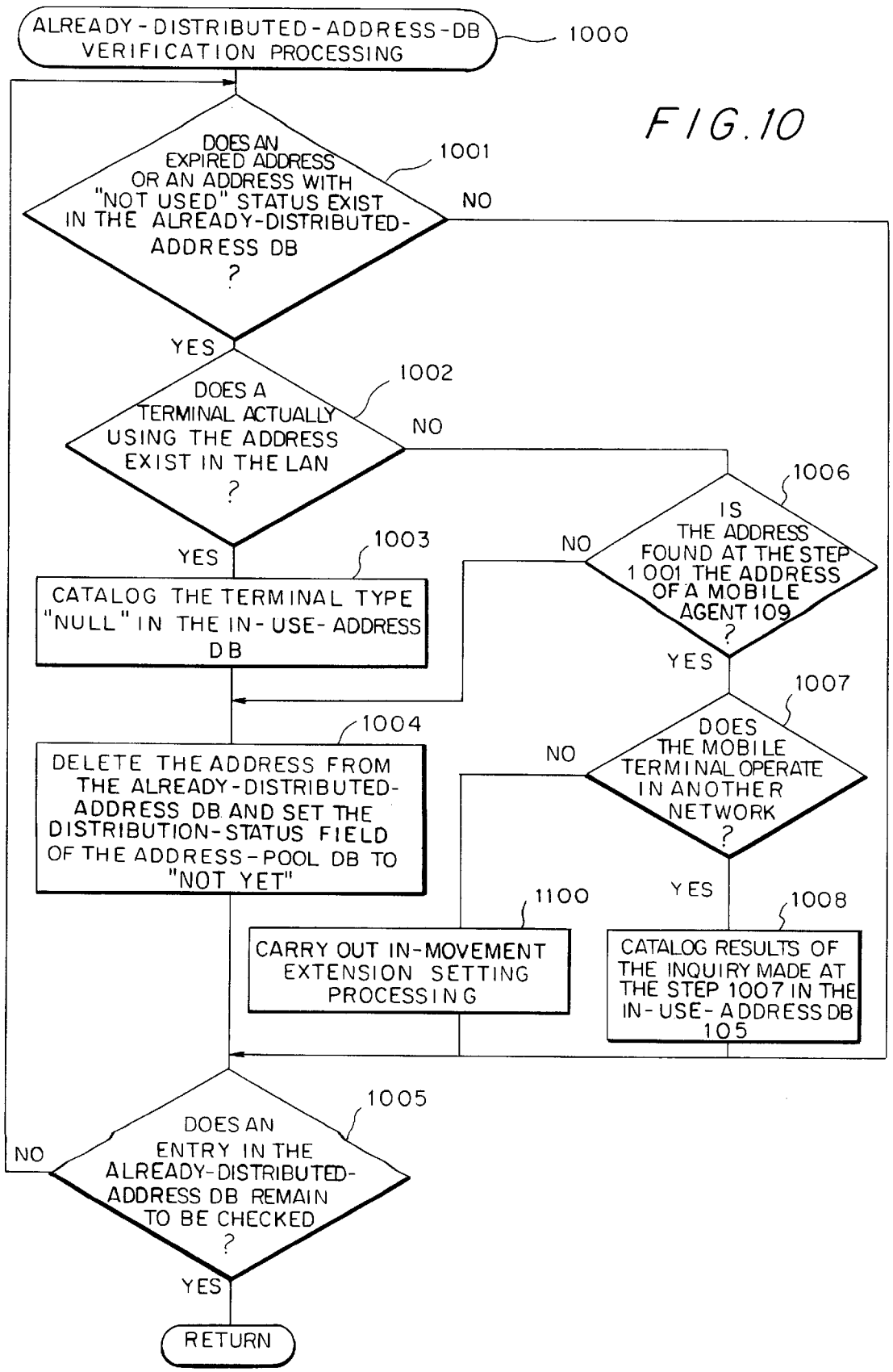

AUTOMATIC ADDRESS DISTRIBUTING SYSTEM

BACKGROUND OF THE INVENTION

The present invention relates to a network system, method and computer program constructed in a Local Area Network (LAN). More particularly, the present invention relates to an automatic address distributing method, computer program and system having a function for distributing addresses each serving as identification information of each terminal connected to the LAN.

With the development of network systems, there have been encountered problems that the amount of work load in system construction and management increases and addresses each serving information for uniquely identifying each terminal connected to a network become obsolete. In order to solve the problems, there have been proposed methods of automatically distributing an address which can be used only for a fixed period of time to each terminal connected to a network.

A representative one of the methods is a Dynamic Host Configuration Protocol (DHCP) described in the DHCP Network Working Group Requests for Comments (RFC) by R. Doms, IETF, Oct. 1993, information on standardizations open to the public. The DHCP allows the amount of work load in the system construction and management to be reduced and makes efficient use of addresses possible.

A point in the dynamic distribution of addresses according to the conventional technology to which attention should be paid is that the same address as one used for a terminal connected to the network must not be distributed to another terminal, that is, duplicate assignment of an address must be avoided. There are two techniques for addressing this problem.

According to a first technique addresses used in a network are examined in advance. The addresses found used in an existing network by the examination conducted in advance are never cataloged in a database used for storing addresses to be distributed by the server having a function for distributing addresses by the DHCP so as to avoid duplicate assignment of an address.

According to a second technique, in order to avoid duplicate assignment of an address by the DHCP, a packet is transmitted to an address to be assigned to a terminal prior to the distribution of the address. In this way, it is possible to determine if the address has been assigned to an existing terminal connected to the network.

The first technique has a problem that an additional work load for examining and cataloging addresses is introduced. Depending upon the size and complexity of the network, the problem caused by the additional work load may be severe.

The second technique has a problem that it may not be possible to examine whether or not a terminal having the same address as the one to be distributed exists due to the following reasons:

1) The terminal is in an off-line state due to, for example, the fact that the power supply thereof is turned off,
2) Because of network congestion, the transmitted packet is lost, and
3) The terminal is moved from the current network to another network with network information relevant to the terminal such as the address thereof left in the current network.

The shorter the period of time in which a distributed address can be used, in other words, the shorter the validity period of a distributed address, the higher the utilization efficiency of the address. However, a packet is required for requesting that the period of time or the validity period be extended. Transmission of such packets gives rise to a problem that the traffic of the network becomes excessively heavy.

SUMMARY OF THE INVENTION

It is an object of the present invention to provide an automatic address distributing method, computer program and system for automatically examining addresses already assigned to terminals connected to a network without regard to the status of the existing terminals and removed terminals.

It is another object of the present invention to provide an automatic address distributing method, computer program and system that eliminates packets for requesting extension of the validity periods of distributed addresses with the efficient use of distributed addresses kept as it is.

In order to achieve the objects described above, the present invention provides an automatic address distributing system having an address distributing server in a network system for automatically distributing network information including address information to terminals connected to the network system. The address distributing server includes a duplicate-address examining apparatus for automatically examining addresses already used by the terminals prior to distribution of an address and an in-use-address storing apparatus for storing examination results produced by the duplicate-address examining apparatus, thereby avoiding distribution of a duplicate address of an address already used in the network system.

The network system further includes a name server for controlling relations between terminal addresses and host names. The duplicate-address examining apparatus examines addresses used by the terminals connected to the network system by making an inquiry to the name server.

The network system further includes a mobility agent for monitoring as well as supporting a movement of a terminal from the network system to another network system. The duplicate-address examining apparatus examines an address used by a terminal having moved to another network system by making an inquiry to the mobility agent.

In addition, the present invention also provides an automatic address distributing system having an address distributing server in a network system for automatically distributing network information including address information to terminals connected to the network system. The network system includes a mobility agent for supporting a movement of a terminal from the network system to another network system and the address distributing server includes a storage apparatus for storing information on the mobility agent. The address distributing server receives a message transmitted by the mobility agent, wherein the message is used to obtain information on a location and movement of a terminal connected to the network system, and automatically stores information conveyed by the message from the mobility agent in the storage apparatus.

Furthermore, the present invention also provides an automatic address distributing system having an address distributing server in a network system for automatically distributing network information including address information to terminals connected to the network system. The address distributing server includes a storage apparatus for storing an initial validity period, a current validity period and the number of validity-period extensions of each distributed address, thereby dynamically modifying the validity period of a distributed address in response to a request for an extension of the validity period made by a terminal owning the distributed address.

In addition, the address distributing server notifies a terminal owning a distributed address of an extended validity period derived by extension of the current validity period by a product of the initial validity period and the number of validity-period extensions in response to a request for an extension of the validity period made by the terminal.

Furthermore, when an address is distributed to a terminal which used the same address previously, the address distributing server notifies the terminal of a current validity period of the distributed address which is derived by using the previous validity period of the distributed address.

The present invention further provides a method and computer program each having steps corresponding to the functions described above with respect to the embodiments of the automatic address distributing system.

BRIEF DESCRIPTION OF THE DRAWINGS

The present invention will be more apparent from the following detailed description, when taken in conjunction with the accompanying drawings, in which:

FIG. 1 is a block diagram illustrating the configuration of an automatic address distributing system of the present invention;

FIG. 2 is a diagram illustrating the structure of an address-pool database (DB);

FIG. 3 is a diagram illustrating the structure of an in-use-address DB;

FIG. 4 is a diagram illustrating the structure of a mobility-agent DB;

FIG. 5 is a diagram illustrating the structure of an already-distributed-address DB;

FIG. 8 is a flowchart of the address distribution processing procedure executed by the address distributing server;

FIG. 9 is flowchart of the in-use-address-DB examination processing procedure executed by the address distributing server; and FIG. 10 is a flowchart of the already-distributed-address-DB examination processing procedure executed by the address distributing server.

DESCRIPTION OF THE PREFERRED EMBODIMENTS

Figure 6:
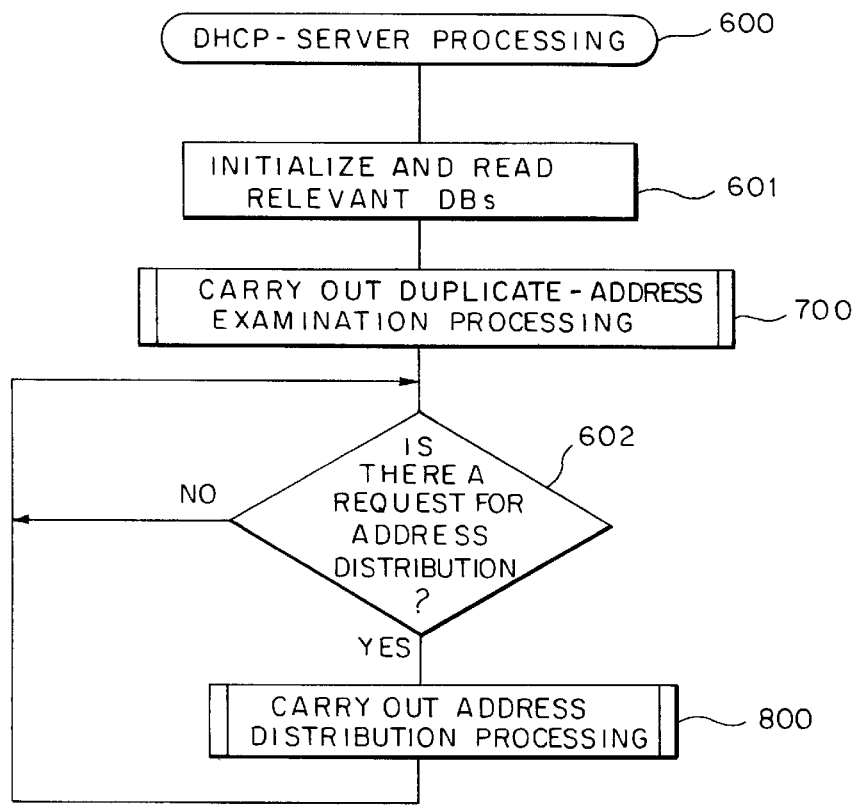
FIG. 6 is a flowchart of the address-distribution-server processing procedure executed by an address distributing server.

The following description explains a system adopting a Transmission Control Protocol/Internet Protocol (TCP/IP) which is widely used in all fields as a communication processing apparatus as an example. In the TCP/IP, an IP address which is referred to hereafter simply as an address is used as information for uniquely identifying a communication partner.

For the reason described above, in order to implement communication by using the TCP/IP, it is necessary to set network information including address assignment in advance for each terminal connected to the network.

As a technique for automatically distributing and setting an address to each terminal, the Dynamic Host Configuration Protocol (DHCP) is used.

In addition, a Mobile IP is available for communication using the TCP/IP as a mobile technology capable of continuously sustaining the communication status of a communication partner even if the partner moves to another network, a network different from the one in which the IP address is used.

The following description explains an example wherein the DHCP and IP are used.

The following description explains in detail a mechanism used in a DHCP server for distributing an address by means of the DHCP. The mechanism is used for preventing the DHCP server from assigning a duplicate address to a terminal connected to the network, that is, preventing the same address as the one used by an existing terminal from being assigned to another terminal.

First, the configuration of a network system to which the present invention is applied and the structure of a DHCP server are explained by referring to FIG. 1.

FIG. 1 is a diagram illustrating an embodiment implementing a configuration of a system comprising a DHCP server 100 and a mobile agent 100 and the internal structures of the DHCP server and the mobile agent. The DHCP server 100 is employed in a network system constructed in a Local Area Network (LAN) and used for distributing and controlling addresses assigned to terminals connected to the LAN by using the DHCP which allows the DHCP server 100 to dynamically distribute and control the addresses of the LAN terminals. The mobile agent 109 is capable of monitoring the state of a movement of a mobile terminal and supporting the movement by adopting a mobile technology which allows communication with a terminal moving to a different network to be carried out in the same way as communication prior to the movement.

The DHCP server 100 distributes and controls network-configuration information including address information to DHCP conforming terminals 115 including mobile terminals connected to a LAN-a denoted by reference numeral 113a.

Reference numeral 108 is a name server (also known as a DNS server) using a DNS (Domain Name Service), one of name services for controlling relations between terminal addresses and host names and converting a terminal address into a corresponding host name or vice versa. In this way, a terminal connected to the network can be identified by using a name referred to hereafter as a host name, a kind of meaningful character information, instead of using an address which is formed as a string of alphanumeric characters.

The mobile agent 109a monitors the state of a movement of a DHCP conforming (mobile) terminal 115 and supports the movement between the LAN-a 113a and a LAN-b denoted by reference numeral 113b. By the same token, reference numeral 109b is a B mobile agent.

Reference numeral 114 is a Wide Area Network (WAN) for connecting the LAN-a 113a and the LAN-b 113b at different locations to each other by using a public or dedicated line.

Reference numeral 101 in the DHCP server 100 is a DHCP-server processing unit employed in the DHCP server 100 for distributing network-configuration information including an address to a DHCP conforming (mobile) terminal 115 in response to a request made by the terminal. Reference numeral 102 is an address-pool database (DB) for storing information such as addresses to be distributed by the DHCP-server processing unit 101 to DHCP conforming (mobile) terminals 115. Reference numeral 103 is an already-distributed-address DB for storing distribution of information such as addresses already done by the DHCP-server processing unit 101 to DHCP conforming (mobile) terminals 115.

Reference numeral 104 is a duplicate-address examining unit for finding out whether or not an address is currently used by a terminal connected to the network after the address has been assigned to the terminal previously under control other than the DHCP server 100. Reference numeral 105 is an in-use-address DB for storing results of examination carried out by the duplicate-address examining unit 104. Reference numeral 106 is a mobility-agent DB for storing information on mobility agents existing in the LAN controlled by the DHCP server 100.

Reference numeral 107 is a communication processing unit for implementing a communication procedure required in an operation to exchange information between the DHCP server 100 and DHCP conforming (mobile) terminals 115. Reference numeral 110 in the A mobile agent 109a is a mobile-terminal supporting processing unit for adding information on a movement destination received from a terminal moving to another LAN to a mobile-terminal status list 111 or for correcting the mobile-terminal status list 111 by using the information as well as passing on a message addressed to the terminal to the current movement destination of the terminal which is obtained from the mobile-terminal status list 111. Reference numeral 112 is a mobile-terminal-status notifying unit used for notifying the contents of the mobile-terminal status list 111 on request.

Configuration elements of the DHCP server 100 that are provided in particular by the present invention are the duplicate-address examining unit 104, the in-use-address DB 105 and the mobile-agent DB 106. In addition, a component of the mobile agent 109 provided particularly by the present invention is the mobile-terminal-status notifying unit 112.

It should be noted that, in the configuration described above, the mobile environment is implemented as follows:

When a DHCP conforming (mobile) terminal 115 moves from the LAN-a 113a to the LAN-b 113b, the DHCP conforming (mobile) terminal 115 sends a request to catalog the network at the movement destination, the LAN-b 113b in this case, to the A mobile agent 109a through the B mobile agent 109b.

Receiving the request for cataloging, the mobile-terminal-status notifying unit 112 of the A mobile agent 109a catalogs the address used by the DHCP conforming (mobile) terminal 115 at the LAN-a 113a as identification information of the terminal 115 moving to the LAN-b 113b along with information on the network of the movement destination, the LAN-b 113b in this case, into the mobile-terminal status list 111. Thereafter, a message addressed to the DHCP conforming (mobile) terminal 115 is passed on to the DHCP conforming (mobile) terminal 115 at the LAN-b 113b by the mobile-terminal-status notifying unit 112 of the A mobile agent 109a by way of the B mobile agent 109b.

Next, pieces of information stored in the DBs of the DHCP server are explained by referring to FIGS. 2 to 5.

FIG. 2 is a diagram illustrating a typical address-pool DB 102 for storing network-configuration information including address information distributed by the DHCP server to terminals connected to the LAN. Reference numeral 21 shown in the FIG. 2 is an address field for holding address information distributed by the DHCP server 100 to DHCP conforming (mobile) terminals 115 connected to the LAN 113. Reference numeral 22 is a distribution-status field containing either "Done" status to indicate that an address in the associated address field 21 has been distributed to a DHCP conforming (mobile) terminal 115 connected to the LAN 113 or "Not yet" status to indicate that an address in the associated address field 21 has been assigned to a DHCP conforming (mobile) terminal 115. Reference numeral 23 is an additional-information field for holding network-configuration information such as a sub-network address and a domain name associated with the address held in the corresponding address field 21. Here, the initial status held in all the distribution-status fields 22 is "Not yet".

FIG. 3 is a diagram illustrating a typical in-use-address DB 105 for storing addresses found currently used in the LAN 113 as a result of examination which is conducted by the DHCP server 100 in order to prevent a duplicate address from being distributed.

Addresses cataloged in the in-use-address DB 105 are each assigned to and currently used by a terminal connected to the network after the address has been assigned to the terminal previously under control other than distribution by the DHCP server. In other words, the address is not known by the DHCP server.

Reference numeral 31 shown in FIG. 3 is an in-use-address field showing an address known to be currently used by a terminal connected to the LAN as a result of examination conducted by the DHCP server. Reference numeral 32 is a terminal-type field showing the type of the technique adopted in the operation to examine terminals carried out by the DHCP server for detecting a terminal currently using an address held in the associated in-use-address field 31. The type of the detection technique can be "DNS", "Mobile" or "Null". Reference numeral 33 is a remark address showing additional information obtained in accordance with the type of the detection technique.

If the type of the detection technique held in the associated terminal-type field 32 is "DNS", the remark field 33 shows the host name of the terminal using the address held in the associated in-use-address field 31. If the type of the detection technique held in the associated terminal-type field 32 is "Mobile", on the other hand, the remark field 33 shows information on a movement-destination network of the terminal using the address held in the associated in-use-address field 31. If the type of the detection technique held in the associated terminal-type field 32 is "Null", the remark field 33 shows nothing. The above terminal detecting methods will be explained in detail by referring to FIG. 7.

FIG. 4 is a diagram illustrating a typical mobility-agent DB 106 for storing information on mobile-agents existing in the LAN controlled by the DHCP server 100. Reference numeral 41 shown in the FIG. 4 is a mobile-agent-address field showing the address of a mobile agent 109 in a network which permits movements by a DHCP conforming (mobile) terminal 115. Reference numeral 42 a related-information field showing the operation status of the mobile agent, the address of which is held in the associated mobile-agent-address field 41.

Here, the pieces of information stored in the mobility-agent DB 106 are set manually by the system manager. As an alternative, a DHCP conforming (mobile) terminal 115 sends a message to the DHCP server 100 to notify the DHCP server 100 of the location of the DHCP conforming (mobile) terminal 115. The contents of the message are then cataloged in the mobility-agent DB 106.

FIG. 5 is a diagram showing a typical already-distributed-address DB 103 for storing distribution of information such as addresses already done by the DHCP server 100 to DHCP conforming (mobile) terminals 115 existing in the LAN.

Reference numeral 51 shown in FIG. 5 is a terminal-identifier field showing information for physically identifying a DHCP conforming (mobile) terminal connected to the LAN uniquely. The terminal-identifier field 51 is used for holding a Media Access Control (MAC) address. Reference numeral 52 is distributed-information field showing information such as an address distributed to a terminal in the LAN indicated by the associated terminal-identifier field 51. Reference numeral 53 is a distribution-time/date field showing a time and a date on which the information shown in the associated distributed-information field 52 was distributed to a terminal in the LAN indicated by the associated terminal-identifier field 51.

Reference numeral 54 is a validity-period (initial-value) field showing an initial validity period of the distributed information shown in the associated distributed-information field 52 with the time and the date shown in the associated distribution-time/date field 53 used as a start. Reference numeral 55 is a validity-period (current-value) field showing a current validity period of the distributed information shown in the associated distributed-information field 52 with the time and the date shown in the associated distribution-time/date field 53 used as a start.

Reference numeral 56 is an extension-count field showing the number of extensions of the validity period of the distributed information shown in the associated distributed-information field 52 requested by a terminal indicated by the associated terminal-identifier field 51. Reference numeral 57 is a use-status field showing whether or not a terminal indicated by the associated terminal-identifier field 51 currently uses the distributed information (address) shown in the associated distributed-information field 52.

Values initially set in the fields for storing a variety of data accompanying the distribution of information such as an address are "0" for the validity-period (current-value) field 55, "0" for the extension-count field 56 and the use status "In use" for the use-status field 57. The use status "Not used" is set in the use-status field 57 when a deliberate notification to stop the use of the distributed address is received from the DHCP conforming (mobile) terminal 115 using the address. It should be noted that the fields of the already-distributed-address DB 103 that are provided by the present invention are validity-period (current-value) field 55 and the extension-count field 56.

Next, processing operations of the DHCP server 100 and how to use the address-pool DB 102, the already-distributed-address DB 103, the in-use-address DB 105 and the mobile-agent DB 106 described above are explained in detail by referring to FIGS. 6 to 10.

FIG. 6 is a flowchart of typical processing carried out by the DHCP-server processing unit 101 employed in the DHCP server 100 for handling a request for distribution of an address made by a DHCP conforming (mobile) terminal connected to the LAN.

As shown in FIG. 6, the DHCP-server processing 600 begins with a step 601 at which operations to read and initialize information in the DBs are carried out at the time the DHCP server is started for the first time. As a result of the initialization operation, the distribution status "Not yet" is set in the distribution-status fields 22 of the address-pool DB 102 while all pieces of data in the DBs 103 and 105 are cleared. The processing flow then goes on to a step 700 at which duplicate-address examination processing is carried out in order to fill the in-use-address DB 105 with addresses used in the LAN.

The processing flow then proceeds to a step 602 to wait for a request for distribution of an address made by a DHCP conforming (mobile) terminal 115. As such a request is received, the processing continues to a step 800 at which address distribution processing is carried out to distribute an address to a DHCP conforming (mobile) terminal 115 issuing the request. Upon the completion of the address distribution processing, the processing flow returns to the step 602 to wait for a next request.

As described above, the DHCP server provided by the present invention examines addresses used by terminals existing in the network prior to the address distribution processing. Thus, it is not necessary to verify duplication of the address of a terminal existing in the network by an address to be distributed in the address distribution processing. As a result, the load of the address distribution processing, steady-state processing of the DHCP server, can be reduced.

Figure 7:
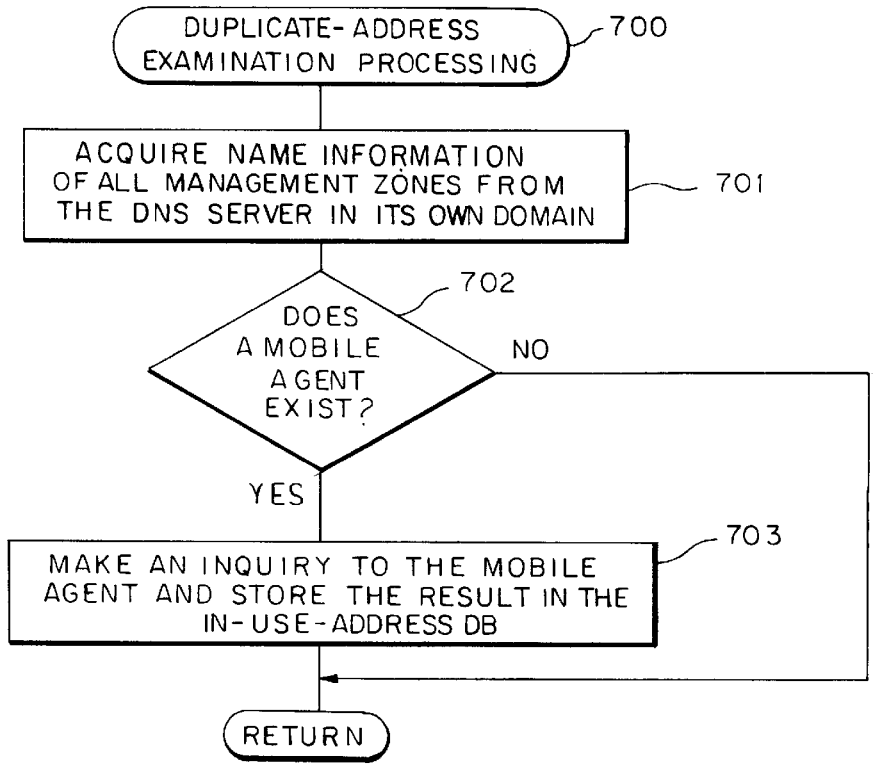
FIG. 7 is a flowchart of the duplicate-address examination processing procedure executed by the address distributing server.

FIG. 7 is a flowchart of typical processing carried out by a duplicate-address examining unit of the DHCP-server processing unit employed in the DHCP server to examine addresses already used by terminals connected to the LAN.

As shown in FIG. 7, the duplicate-address examination processing 700 which is carried out at the step 700 of the flowchart shown in FIG. 6 begins with a step 701 to make an inquiry to the DNS server 108 about all pieces of name information controlled by the DNS server 108. The DNS server 108 is used for carrying out DNS-server processing on the LAN, to which the DHCP server 100 is connected. Results of the inquiry are cataloged in the in-use-address field 31 and the remark field 33 of the in-use-address DB 105 and the terminal type "DNS" is set in the associated terminal-type field 32.

The processing flow then goes on to a step 702 at which the mobility-agent DB 106 is searched for a mobile agent 109. If the mobile agent 109 is found cataloged in mobility-agent DB 106, the processing flow goes on to a step 703 at which an inquiry about information on the movement status of DHCP conforming (mobile) terminals 115 controlled and preserved by the mobile agent 109 is made to the mobile agent 109. Results of the inquiry are cataloged in the in-use-address field 31 and the remark field 33 of the in-use-address DB 105 and the terminal type "Mobile" is set in the associated terminal-type field 32.

The inquiry about the terminal-movement status received by the mobile agent 109 from the DHCP server 100 is processed by the mobile-terminal-status notifying unit 112 which informs the DHCP server 100 making the inquiry of the movement status of DHCP conforming (mobile) terminals 115 cataloged on the mobile-terminal status list 111.

In addition, even though not shown in FIG. 7, as an option, during the duplicate-address examination processing 700, an ICMP (Internet Control Message Protocol) echo message, a message for verifying a communication partner, is transmitted to all addresses stored in the address fields 21 of the address-pool DB 102. If any terminal to which the ICMP echo message is addressed responds to the message, the address is cataloged in the in-use-address field 31 and the terminal type "Null" is set in the terminal-type field 32 of the in-use-address DB 105. The terminal type "Null" in this case has the same meaning as "Others".

FIG. 8 is a flowchart of typical address distribution processing, part of the DHCP-server processing described above, to find out a proper address and returns the proper address to a DHCP conforming (mobile) terminal in the LAN in response to a request for distribution of an address made by the terminal.

As shown in FIG. 8, the address distribution processing 800 begins with a step 801 to examine whether or not an undistributed address exists in the address-pool DB 102 by checking the distribution-status field 22 thereof. If an undistributed address exists in the address-pool DB 102, the processing flow goes on to a step 900 at which processing is carried out to verify the contents of the in-use-address DB 105. The processing flow then proceeds to a step 1,000 at which processing is carried out to verify the contents of the already-distributed-address DB 103. The processing flow then continues to a step 802 to form a judgment as to whether or not unused or undistributed addresses (that is, addresses which do not match any used address cataloged in the in-use-address DB 105 or do not match any distributed address cataloged in the already-distributed-address DB 103) exist in the address-pool DB 102.

If such addresses exist, the processing flow goes on to a step 803 at which an address appropriate for the terminal making the request for distribution of an address is selected from the existing addresses. If such addresses do not exist, on the other hand, the processing flow goes on to a step 805 at which the request for distribution of an address is discarded.

If an undistributed address in the address-pool DB 102 is not found at the step 801, on the other hand, the processing flow goes on to a step 804 to examine whether or not an address already distributed but actually not used exists in the already-distributed-address DB 103. If such an address exists in the already-distributed-address DB 103, the processing flow proceeds to a step 900 to carry out the same processing as the case in which an undistributed address exists in the address-pool DB 102 described above. If such an address does not exist in the already-distributed-address DB 103, on the other hand, the processing flow proceeds to the step 805 at which the request for distribution of an address is discarded.

In the processing described above, particularly, the processing 900 carried out to verify the contents of the in-use-address DB 105 and the processing 1,000 carried out to verify the contents of the already-distributed-address DB 103 are provided by the present invention.

FIG. 9 is a flowchart of typical processing to verify the in-use-address DB 105, to be more specific, processing to verify and update the contents of the in-use-address DB 105 which is used for controlling addresses used in the LAN prior to distribution of an address in the address distribution processing.

As shown in FIG. 9, the in-use-address-DB verifying processing 900 carried out at the step 900 of the flowchart shown in FIG. 8 begins with a step 901 at which an ICMP (Internet Control Message Protocol) echo message, a message used for verifying a communication partner, is transmitted to each address cataloged in the in-use-address DB 105 to verify whether or not a terminal using the address indeed exists in the LAN 113. If a terminal using the address does not exist in the LAN 113, the processing flow goes on to a step 902 at which the address used by the terminal is deleted from the in-use-address DB 105.

FIG. 10 is a flowchart of typical processing to verify the already-distributed-address DB 103, to be more specific, processing to verify and update the contents of the already-distributed-address DB 103 which is used for controlling addresses already distributed in the LAN prior to distribution of an address in the address distribution processing.

As shown in FIG. 10, the already-distributed-address-DB verifying processing 1,000 carried out at the step 1,000 of the flowchart shown in FIG. 8 begins with a step 1,001 to examine whether or not an expired address or an address with "Not used" status exists in the already-distributed-address DB 103 by checking the pieces of information stored in the distribution-time/date field 53, the validity-period (initial-value) field 54, the validity-period (current-value) field 55 and the use-status field 57 of the already-distributed-address DB 103. If such an address exists, the processing flow goes on to a step 1,002 at which an Internet Control Message Protocol (ICMP) echo message, a message used for verifying a communication partner, is transmitted to the address verify whether or not a terminal actually using the address exists in the LAN 113.

If such a terminal exists, the processing flow proceeds to a step 1003 at which the address, the terminal type "Null" and a blank are cataloged in the in-use-address field 31, the terminal-type field 32 and the remark field 33 respectively of the in-use-address DB 105. The processing flow then continues to a step 1004 at which the address is deleted from the already-distributed-address DB 103 and the distribution-status field 22 of the address-pool DB 102 is updated to the distribution status "Not yet".

If the outcome of the step 1002 indicates that a terminal actually using the expired address or the address with "Not used" status does not exist in the LAN 113, on the other hand, the processing flow goes on to a step 1006 to find out whether or not the distributed-information field 52 of the already-distributed-address DB 103 associated with the expired address or the address with "Not used" status indicates the address of a mobile agent 109, that is, whether or not the expired address or the address with "Not used" status is the address of a mobile agent 109. If the address is not the address of a mobile agent 109, the processing flow goes on to the step 1004. If the address is the address of a mobile agent 109, on the other hand, the processing flow goes on to a step 1007 at which an inquiry about the movement status of the mobile terminal is made to the mobile agent 109.

If a response to the inquiry indicates that the mobile terminal operates in another network, the processing flow goes on to a step 1008 at which results of the inquiry are cataloged in the in-use-address field 31 and the remark field 33 of the in-use-address DB 105 while the terminal type "Mobile" is set in the terminal-type field 32 thereof. If the response to the inquiry indicates that the mobile terminal does not operate in another network, on the other hand, the processing flow goes on to a step 1100 at which in-movement extension setting processing is carried out.

The processing flow then continues to a step 1005 to form a judgment as to whether or not an entry in the already-distributed-address DB 103 remains to be checked. If an entry in the already-distributed-address DB 103 remains to be checked, the processing flow returns to the step 1,001 to repeat the processing for the next entry. Otherwise, the processing is completed.

If the use-status field 57 of the already-distributed-address DB 103 is "Not used", the in-movement extension setting processing 1100 of the step 1100 is the same as the processing carried out at the step 1,004. If the use-status field 57 of the already-distributed-address DB 103 is "In use", on the other hand, the in-movement extension setting processing 1100 is carried out in the same way as if a request for extension of the validity period of the distributed address had been received from the terminal. In this case, the contents of the extension-count field 56 of the already-distributed-address DB 103 are incremented by one.

If there is no change even after the in-movement extension setting processing 1100 has been carried out repeatedly a predetermined number of times, that is, if the response to the inquiry made at the step 1007 does not change to "YES", the extension-count field 56 of the already-distributed-address DB 103 is reset to "0" while the use status "Not used" is set in the use-status 57 thereof.

In this way, the automatic address distribution system provided by the present invention is capable of avoiding distribution of an address that would duplicate an address already used by an existing terminal without regard to the operation status of the terminal already in use in the LAN. In addition, it is possible to obtain the use status of a distributed address assigned to a mobile terminal and continue the use of the distributed address in a network of a movement destination. Further, an address distributed to a moving mobile terminal can be used continuously to a movement destination after the mobile terminal has moved thereto without worrying about the validity period of the distributed address.

While the present invention has been described with reference to an illustrative embodiment which is no more than a preferred embodiment, the description is not intended to be construed in a limiting sense. Various modifications of the illustrative embodiment as well as other embodiments of the present invention will be apparent to persons skilled in the art upon reference to the description. For example, for the sake of explanation simplicity, in the embodiment described above, the duplicate-address examination processing is carried out by the DHCP server only at the start of the DHCP server processing. It should be noted that, however, that the duplicate-address examination processing can also be carried out periodically without regard to the address distribution processing so as to allow the contents of the in-use-address DB to be spontaneously updated from time to time.

In addition, in the embodiment described above, the DHCP server examines the in-use-address DB before an address is about to be distributed in order to avoid duplicate assignment of the address. It is worth noting, however, that duplicate assignment of an address can also be avoided by deleting addresses cataloged in the in-use-address DB from the address-pool DB of the DHCP-server processing unit or forcibly setting the distribution status "Done" in the distribution-status field for the addresses.

Furthermore, in the embodiment described above, the DNS is used for implementing a name service. It should be noted, however, that a name service other than the DNS can also be adopted without causing any problems in the implementation of the present invention. It is a matter of course that a name service of any kind has terminal-address information controlled thereby. It is only a means for making an inquiry about address information that is different from name service to name service. However, the present invention uses only address information of a terminal from the name service and is not dependent on the means for making an inquiry about address information.

In addition, if the system uses a plurality of name services, it is necessary to merely set a type indicating the name service in a type set in the terminal-type field of the in-use-address DB.

With reference to FIG. 5, the following description explains in detail a mechanism employed in the DHCP server which is used for dynamically controlling the validity periods of addresses so that the DHCP server for distributing addresses in accordance with the DHCP is capable of limiting the validity period of a distributed address and dynamically changing the validity period of the distributed address.

Here, prior to detailed explanation of the automatic distribution mechanism, control of distributed addresses in address distribution adopting the DHCP is described.

In the DHCP, the validity period of each distributed address can be set so as to allow addresses, which are limited resources, to be used efficiently. It is thus necessary for a DHCP conforming terminal to obtain a permission to continue the use of an address once distributed thereto after the address has expired by transmitting a message requesting an extension of the validity period to the DHCP server at each address-expiration time.

In order to improve the utilization efficiency of an address, it is desirable to shorten the validity period of the address. In this case, however, the number of messages requesting extension of validity periods also inevitably increases, making the traffic in the network heavier excessively. The present mechanism is provided to get rid of this contradiction.

First of all, dynamic modification (extension) of the validity period of an already distributed address carried out in response to a request for extension received from a DHCP conforming (mobile) terminal owning the distributed address is explained. A request for extension received from a DHCP conforming (mobile) terminal is processed in the DHCP server 100 by using the already-distributed-address DB as follows.

When an address is distributed to a DHCP conforming (mobile) terminal 115, the DHCP server 100 notifies the DHCP conforming (mobile) terminal 115 of a standard validity period for the distributed address which is also cataloged in the validity-period (initial-value) field 54 of the already-distributed-address DB 103. At the same time, the extension-count field 56 of the already-distributed-address DB 103 is reset to "0".

Then, let a request for extension of the validity period be received from the DHCP conforming (mobile) terminal 115 after some time has lapsed. In this case, the extension-count field 56 is incremented by one. It should be noted that, in the present embodiment, the validity-period (current-value) field 55 of the already-distributed-address DB 103 is not used.

In response to the request, the validity period set in the validity-period (initial-value) field 54 of the already-distributed-address DB 103 is updated by the DHCP server 100 to a value calculated using an expression (1). That is to say, the new validity period represents a date obtained by adding the value of the expression (1) to the date set in the distribution-time/date field 53. The new validity period calculated by the expression (1) is transmitted to the DHCP conforming (mobile) terminal 115.

$$\text{Validity period (initial value)} + \text{Validity period (initial value)} \times \text{The number of extensions} \quad (1)$$

Thus, the validity period of a distributed address is increased each time a request for extension of the period is made, lengthening the interval at which the request for extension needs to be made by a DHCP conforming (mobile) terminal 115. As a result, the amount of traffic of requests for extension in the network is reduced continuously with the lapse of time even if the validity period (initial value) is set at a small value.

The following description explains a case in which the validity period communicated to the DHCP conforming (mobile) terminal 115 at the address-distribution time is modified, that is, lengthened or shortened.

The validity period communicated to the DHCP conforming (mobile) terminal 115 at the address-distribution time is controlled in the DHCP server 100 by using the already-distributed-address DB as follows.

As described above, in the case of an initial address distribution, the DHCP server 100 informs the DHCP conforming (mobile) terminal 115 of a standard validity period for the distributed address which is cataloged in the validity-period (initial-value) field 54 of the already-distributed-address DB 103. At the same time, the extension-count field 56 of the already-distributed-address DB 103 is reset to "0".

Then, let a request for extension of the validity period be received from the DHCP conforming (mobile) terminal 115 after some time has lapsed. In this case, the extension-count field 56 is incremented by one.

Thereafter, if a request for reuse of an address with the use status "Not used" set in the use-status field 57 of the already-distributed-address DB 103 is received from a DHCP conforming (mobile) terminal 115, the DHCP conforming (mobile) terminal 115 is informed of a validity period (current value) calculated typically by using an expression (2) given below. At the same time, the validity period (current value) is stored in the validity-period (current-value) field 55 of the already-distributed-address DB 103. Normally, the use status "Not used" is set in the use-status field 57 when the validity period expires or the DHCP conforming (mobile) terminal 115 deliberately requests the termination of the use of the distributed address.

At the same time, the extension-count field 56 of the already-distributed-address DB 103 is reset to "0".

Then, let a request for extension of the validity period be received from the DHCP conforming (mobile) terminal 115 after some time has lapsed. In this case, the extension-count field 56 is incremented by one. In response to the request, the validity period set in the validity-period (current-value) field 55 of the already-distributed-address DB 103 is updated by the DHCP server 100 to a value calculated using the expression (2). That is to say, the new validity period represents a date obtained by adding the value of the expression (2) to the date set in the distribution-time/date field 53. The new validity period calculated by the expression (2) is transmitted to the DHCP conforming (mobile) terminal 115.

$$\text{Validity period (initial value)} + \text{Validity period (initial value)}/2 \times \text{The number of extensions} \quad (2)$$

In this way, the validity period notified at an address-distribution time can be changed dynamically to a value determined by the validity period used at the previous address distribution. As a result, a distributed address can be used continuously for a long period of time without issuing a request for extension at subsequent address-distribution times even in the case of a short validity period (initial value).

As described above, according to the present invention, the DHCP server for carrying out distribution of addresses is capable of automatically examining addresses used by terminals existing in the network, giving rise to an effect of allowing the network manager to set distributed-address information in the DHCP server without the need to know the present state of address utilization.

In addition, there is also provided another effect that the DHCP server runs a small risk of distributing an address with possibility of duplicating an already assigned address, allowing the procedure for distributing an address to be executed with a higher degree of efficiency.

Further, in the examination of existing terminals, a name service for controlling relations between terminal names and addresses and a movement supporting function for supporting mobile terminals are used, giving rise to an effect that an existing terminal can be found regardless of the operation status of the terminal which is affected by the on/off state of the power or the movement of the terminal.

Furthermore, the DHCP server is capable of obtaining information on the movement status of a mobile terminal and distributing an address with a limited validity period to a mobile terminal, giving rise to an effect that addresses can be distributed with a high degree of efficiency in a system using mobile terminals in addition to stationary ordinary terminals.

Moreover, the DHCP server is capable of extending a validity period to as long a period as possible in accordance with the previous use status so as to result in a longer interval at which a request for period extension is sent to the DHCP server, giving rise to an effect that frequent failures occurring in the DHCP server, if any, hardly have an effect on terminals owning distributed addresses.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. An automatic address distributing system comprising:
    an address distributing server connected to a network system for automatically distributing network information including address information to terminals connected to said network system,
    wherein said network system comprises:
        a mobility agent for supporting movement of a terminal from said network system to another network system, said mobility agent including a mobile-terminal supporting processing unit for adding information of a movement status including a movement destination of the terminal received from the terminal to a mobile-terminal status list or correcting the mobile-terminal status list by using the information, and a mobile-terminal-status notifying unit for receiving an inquiry about the movement status of the terminal from said address distributing server and informing said address distributing server of the movement status cataloged on the mobile-terminal status list,
    wherein said address distributing server is provided with a storage for storing the information of the movement status, and
    wherein said address distributing server, when receiving the information of the movement status transmitted by said mobile-terminal-status notifying unit, automatically stores the information of the movement status in said storage.

2. An automatic address distributing system comprising:
    an address distributing server connected to a network system for automatically distributing network information including address information to terminals connected to said network system,
    wherein said network system comprises:
        a mobility agent for supporting movement of a terminal from said network system to another network system, said mobility agent including a mobile-terminal supporting processing unit for adding information of a movement status including a movement destination of the terminal received from said terminal to a mobile-terminal-status notifying unit for receiving an inquiry about the movement status of the terminal from said address distributing server and informing said address distributing server of the movement status catalogued on the mobile-terminal status list, wherein said address distributing server is provided with a storage for storing a distributed address and information distributed along with said distributed address for each terminal to which said distributed address and said information have been distributed, and wherein said address distributing server, when receiving the information of the movement status transmitted by said mobile-terminal-status notifying unit, said information of the movement status indicates that the terminal uses said distributed address, carries out processing to dynamically extend a validity period of said distributed address without receiving a request for extension of said validity period of said distributed address.

3. A method of distributing address information of a server connected to a network system, comprising the steps of:

automatically distributing network information including address information to terminals connected to said network system by said server;

adding, in a mobility agent connected to said network system, information of a movement status including a movement destination of a terminal received from the terminal to a mobile-terminal status list or correcting the mobile-terminal status list by using the information of the movement status;

receiving, in the mobility agent, an inquiry about the movement status from said server;

informing, in the mobility agent, said server of the information of the movement status cataloged on the mobile-terminal status list; and when said server receiving the information of the movement status, automatically storing the movement status in a storage in said server.

4. A method of distributing address information of a server connected to a network system, comprising the steps of:

automatically distributing network information including address information to terminals connected to said network system by said server;

adding, in a mobility agent connected to said network system, information of a movement status including a movement destination of a terminal received from the terminal to a mobile-terminal status list or correcting the mobile-terminal status list by using the information of the movement status;

receiving, in the mobility agent, an inquiry about the movement status from said server;

informing, in the mobility agent, said server of the information of the movement status cataloged on the mobile-terminal status list; and when said server receiving the movement status transmitted by the mobility agent, wherein the information of the movement status indicates that the terminal uses said distributed address, carrying out processing to dynamically extend a validity period of said distributed address by said server without receiving a request for extension of said validity period of said distributed address.

5. A computer program stored on a storage medium executable by a computer for distributing address information in a network system, said computer program when executed by said computer causes said computer to perform the steps of:

automatically distributing network information including address information to terminals connected to said network system;

adding information of a movement status including a movement destination of a terminal received from the terminal to a mobile-terminal status list or correcting the mobile-terminal status list by using the information of the movement status;

receiving an inquiry about the movement status from another computer;

informing the another computer of the information of the movement status cataloged on the mobile-terminal status list; and when receiving information of the movement status from the another computer, automatically storing the movement status in a storage.

6. A computer program stored on a storage medium executable by a computer for distributing address information in a network system, said computer program when executed by said computer causes said computer to perform the steps of:

automatically distributing network information including address information to terminals connected to said network system;

adding information of a movement status including a movement destination of a terminal received from the terminal to a mobile-terminal status list or correcting the mobile-terminal status list by using the information of the movement status as well as passing on a message addressed to the terminal to the movement destination by a mobile-terminal support processing unit in a mobility agent;

adding information of a movement status including a movement destination of a terminal received from the terminal to a mobile-terminal status list or correcting the mobile-terminal status list by using the information of the mobile status;

receiving an inquiry about the movement status from another computer;

informing the another computer of the information of the movement status cataloged on the mobile-terminal status list; and when receiving the information of the movement status transmitted by the another computer, wherein the information of the movement status indicates that the terminal uses said distributed address, carrying out processing to dynamically extend a validity period of said distributed address without receiving a request for extension of said validity period of said distributed address from the terminal.

* * * * *